(12) United States Patent
Dollmeyer et al.

(10) Patent No.: US 7,231,291 B2
(45) Date of Patent: Jun. 12, 2007

(54) APPARATUS, SYSTEM, AND METHOD FOR PROVIDING COMBINED SENSOR AND ESTIMATED FEEDBACK

(75) Inventors: Thomas A. Dollmeyer, Columbus, IN (US); Patrick J. Shook, Franklin, IN (US); J. Steve Wills, Columbus, IN (US); Joan Wills, Nashville, IN (US)

(73) Assignee: Cummins, Inc., Columbus, IN (US)

( * ) Notice: Subject to any disclaimer, the term of this patent is extended or adjusted under 35 U.S.C. 154(b) by 0 days.

(21) Appl. No.: 11/227,320

(22) Filed: Sep. 15, 2005

(65) Prior Publication Data

US 2007/0061064 A1   Mar. 15, 2007

(51) Int. Cl.
*G06F 19/00* (2006.01)
(52) U.S. Cl. ..................... 701/114; 73/118.1
(58) Field of Classification Search ............... 701/114; 700/30, 45; 60/286, 295; 73/118.1
See application file for complete search history.

(56) References Cited

U.S. PATENT DOCUMENTS

| | | | | |
|---|---|---|---|---|
| 5,548,597 | A | * | 8/1996 | Kayama et al. ............. 714/736 |
| 5,682,317 | A | * | 10/1997 | Keeler et al. ................ 700/30 |
| 6,405,528 | B1 | | 6/2002 | Christen et al. ............. 60/295 |
| 6,622,480 | B2 | | 9/2003 | Tashrio et al. ............... 60/295 |
| 6,756,904 | B2 | | 6/2004 | Kinugawa et al. .......... 340/606 |
| 6,758,039 | B2 | | 7/2004 | Kuboshima et al. .......... 60/311 |
| 6,829,889 | B2 | | 12/2004 | Saito et al. .................. 60/291 |
| 6,829,890 | B2 | | 12/2004 | Gui et al. ..................... 60/295 |
| 6,854,265 | B2 | | 2/2005 | Saito et al. .................. 60/295 |
| 6,907,873 | B2 | | 6/2005 | Hamahata .................. 123/676 |
| 2002/0196153 | A1 | | 12/2002 | Kinugawa et al. .......... 340/606 |
| 2003/0167757 | A1 | | 9/2003 | Boretto et al. ............... 60/295 |
| 2004/0172933 | A1 | | 9/2004 | Saito et al. .................. 60/277 |
| 2004/0204818 | A1 | | 10/2004 | Trudell et al. ............... 701/114 |

\* cited by examiner

*Primary Examiner*—Hieu T. Vo
(74) *Attorney, Agent, or Firm*—Kunzler & Mckenzie; J. Bruce Schelkopf (57) ABSTRACT

An apparatus, system, and method are disclosed for providing system feedback from combined input values in a sensor-based control system wherein the reliability of a sensor response is questionable under defined conditions. The apparatus, in one embodiment, is configured to determine an output value. The apparatus may include an input module for receiving input from a sensor configured to provide a sensor response, an estimated expected response value, and a control module for determining an output value based on input from the sensor response and from the expected response value. To determine an output value, the sensor response and the expected response value may be weighted according to a predicted reliability of the sensor response or the model. The system may be embodied in an exhaust gas after-treatment system.

26 Claims, 10 Drawing Sheets

Trust Factor (n)
n=trust in $m_{by\Delta P}$

|  | Low | Med | High | |
|---|---|---|---|---|
|  |  |  |  | Uniform Distribution |
| High | Med | High | High |  |
| Med | Low | Med | High |  |
| Low | Low | Low | Med |  |

Volume Flow Rate ACMS

Fig. 6A

| n | Time |
|---|---|
| 10 | 2 sec |
| 9 | 20 sec |
| 8 |  |
| 7 | 20 min |
| 6 |  |
| 5 |  |
| 4 | 2 hrs |
| 3 |  |
| 2 |  |
| 1 |  |
| 0 | 20 hrs |

Time constant = f(n)

APPARATUS, SYSTEM, AND METHOD FOR PROVIDING COMBINED SENSOR AND ESTIMATED FEEDBACK

BACKGROUND OF THE INVENTION

1. Field of the Invention

This invention relates to feedback systems and more particularly relates to apparatus, systems and methods for combining sensor-based input and input from an estimation to determine an output value.

2. Description of the Related Art

Environmental concerns have motivated the implementation of emission requirements for internal combustion engines throughout much of the world. Governmental agencies, such as the Environmental Protection Agency (EPA) in the United States, carefully monitor the emission quality of engines and set acceptable emission standards, to which all engines must comply. Generally, emission requirements vary according to engine type. Emission tests for compression-ignition (diesel) engines typically monitor the release of diesel particulate matter (PM), nitrogen oxides ($NO_x$), and unburned hydrocarbons (UHC). Catalytic converters implemented in an exhaust gas after-treatment system have been used to eliminate many of the pollutants present in exhaust gas. However, to remove diesel particulate matter, typically a diesel particulate filter (DPF) must be installed downstream from a catalytic converter, or in conjunction with a catalytic converter.

A common diesel particulate filter comprises a porous ceramic matrix with parallel passageways through which exhaust gas passes. Particulate matter subsequently accumulates on the surface of the filter, creating a buildup which must eventually be removed to prevent obstruction of the exhaust gas flow. Common forms of particulate matter are ash and soot. Ash, typically a residue of burnt engine oil, is substantially incombustible and builds slowly within the filter. Soot, chiefly composed of carbon, results from incomplete combustion of fuel and generally comprises a large percentage of particulate matter buildup. Various conditions, including, but not limited to, engine operating conditions, mileage, driving style, terrain, etc., affect the rate at which particulate matter accumulates within a diesel particulate filter.

Accumulation of particulate matter typically causes backpressure within the exhaust system. Excessive backpressure on the engine can degrade engine performance. Particulate matter, in general, oxidizes in the presence of $NO_2$ at modest temperatures, or in the presence of oxygen at higher temperatures. If too much particulate matter has accumulated when oxidation begins, the oxidation rate may get high enough to cause an uncontrolled temperature excursion. The resulting heat can destroy the filter and damage surrounding structures. Recovery can be an expensive process.

To prevent potentially hazardous situations, it is desirable to oxidize accumulated particulate matter in a controlled regeneration process before it builds to excessive levels. To oxidize the accumulated particulate matter, temperatures generally must exceed the temperatures typically reached at the filter inlet. Oxidation temperatures will be achieved under normal operating conditions in some applications, although in others, additional methods to initiate regeneration of a diesel particulate filter must be used. In one method, a reactant, such as diesel fuel, is introduced into an exhaust after-treatment system to generate temperature and initiate oxidation of particulate buildup in the filter. Partial or complete regeneration may occur depending on the duration of time the filter is exposed to elevated temperatures and the amount of particulate matter remaining on the filter. Partial regeneration, caused either by controlled regeneration or uncontrolled regeneration, can contribute to irregular distribution of particulate matter across the substrate of a particulate filter.

Controlled regeneration traditionally has been initiated at set intervals, such as distance traveled or time passed. Interval based regeneration, however, has not proven to be totally effective for several reasons. First, regenerating a particulate filter with little or no particulate buildup lessens the fuel economy of the engine and unnecessarily exposes the particulate filter to destructive temperature cycles. Second, if particulate matter accumulates significantly before the next regeneration, backpressure from blockage of the exhaust flow can negatively affect engine performance. In addition, regeneration (intentional or unintentional) of a particulate filter containing large quantities of particulate buildup can become uncontrolled and potentially cause filter failure or the like. Consequently, many particulate filters regenerated on a set interval must be replaced frequently to maintain the integrity of an exhaust gas after-treatment system.

Recently, attempts have been made to estimate the amount of particulate matter accumulated in a particulate filter in order to respond more efficiently to actual particulate buildup, such as, in one widely used method, through differential pressure across a diesel particulate filter. These attempts, however, often do not account for variations in engine operating conditions, sensor noise-to-measurement levels, exhaust flow estimate errors, and unevenly distributed particulate accumulation. In many cases they also integrate errors over time and deviate from real soot loading conditions.

From the foregoing discussion, it should be apparent that a need exists for an apparatus, system, and method that provide representative feedback based on combined input from a sensor and input from a calculated estimate. Beneficially, such an apparatus, system, and method, particularly when applied to an exhaust gas after-treatment system, would enable effective and timely regeneration of a diesel particulate filter, increase the fuel economy of a vehicle, extend the life expectancy of a diesel particulate filter, and increase the overall efficiency of an engine.

SUMMARY OF THE INVENTION

The present invention has been developed in response to the present state of the art, and in particular, in response to the problems and needs in the art that have not yet been fully solved by currently available sensor-based control systems wherein the reliability of the sensor response is questionable under defined conditions. Accordingly, the present invention has been developed to provide an apparatus, system, and method for providing system feedback from combined input values that overcome many or all of the above-discussed shortcomings in the art.

The apparatus, in one embodiment, is configured to determine an output value in a sensor-based control system. The apparatus may include an input module for receiving input from a sensor configured to provide a sensor response, a model for defining an expected response value, and a control module for determining an output value based on input from the sensor response and from the expected response value. To determine an output value, the sensor response and the expected response value may be weighted according to a predicted reliability of the sensor response or the model.

The apparatus is further configured, in one embodiment, to determine a predicted reliability, or a trust factor, from parameters based on defined conditions. In one embodiment, the trust factor is converted to a time constant based on an exhaust flow rate from an internal combustion engine. In such an embodiment, the input module may receive input from a differential pressure sensor disposed on an upstream side and a downstream side of a particulate filter, and the output value may be an estimation of the soot load accumulation on the particulate filter.

A system of the present invention is also presented to treat exhaust gas emitted as a byproduct of operation of an internal combustion engine. The system may be embodied in an exhaust gas after-treatment system. In particular, the system, in one embodiment, includes a sensor for providing a sensor response and a controller for determining an output value based on input from the sensor response and from an expected response value. The system may further include a control unit for determining a defined condition, an internal combustion engine, a particulate filter, a catalytic component, a differential pressure sensor, and a reactant delivery mechanism. A model may be used to determine an expected response value.

A method of the present invention is also presented for providing system feedback from combined input values in a sensor-based control system in which the reliability of a sensor response is questionable under defined conditions. The method in the disclosed embodiments substantially includes the steps necessary to carry out the functions presented above with respect to the operation of the described apparatus and system. In one embodiment, the method includes receiving a sensor response, determining an expected response value, and determining an output value based on input from the sensor response and the expected response value. The method also may include determining a predicted reliability, converting the predicted reliability to a time constant, using the output value to determine an estimation of the soot load accumulation on a particulate filter, and initiating regeneration of a particulate filter.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The present invention enables estimation of a condition based on defined conditions. The estimation may be based on a sensor response and/or an expected response. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
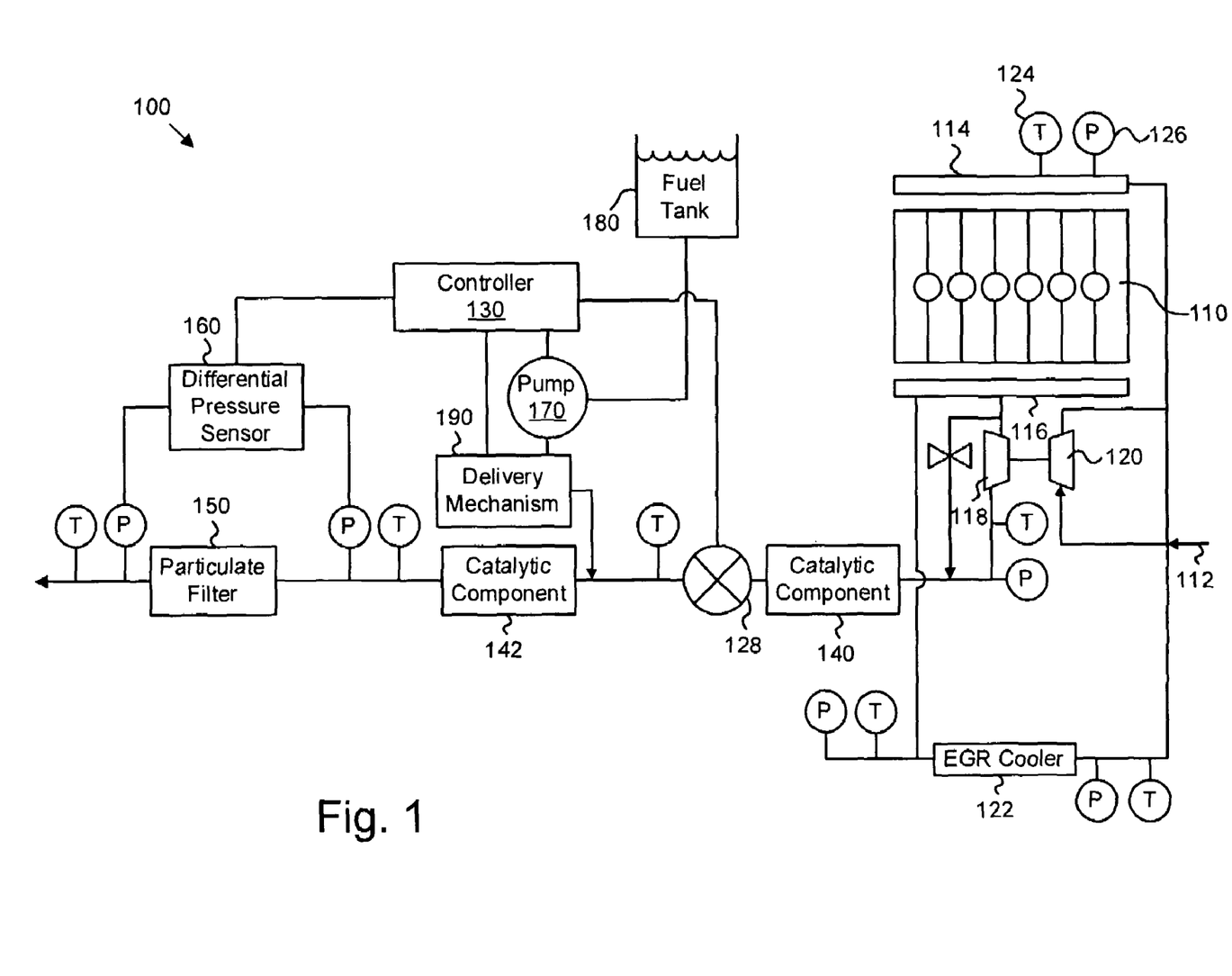
FIG. 1 is a schematic block diagram illustrating one embodiment of an exhaust gas after-treatment system in accordance with the present invention.

FIG. 1 depicts one embodiment of an exhaust gas after-treatment system 100 in accordance with the present invention. The exhaust gas after-treatment system 100 may be implemented in conjunction with an internal combustion engine 110 to remove various chemical compounds and particulates from emitted exhaust gas. As illustrated, the exhaust gas after-treatment system 100 may include an internal combustion engine 110, a controller 130, one or more catalytic components 140, 142, a particulate filter 150, a differential pressure sensor 160, a reactant pump 170, a fuel tank 180, and a reactant delivery mechanism 190. Exhaust gas treated in the exhaust gas after-treatment system 100 and released into the atmosphere consequently contains significantly fewer pollutants, such as diesel particulate matter (PM), nitrogen oxides ($NO_x$), hydrocarbons (HC), and carbon monoxide (CO), than untreated exhaust gas.

The exhaust gas after-treatment system 100 may further include an air inlet 112, an intake manifold 114, an exhaust manifold 116, a turbocharger turbine 118, a turbocharger compressor 120, an exhaust gas recirculation (EGR) cooler 122, temperature sensors 124, and pressure sensors 126. In one embodiment, an air inlet 112 vented to the atmosphere enables air to enter the exhaust gas after-treatment system 100. The air inlet 112 may be connected to an inlet of the intake manifold 114. The intake manifold 114 includes an outlet operatively coupled to the compression chamber of the internal combustion engine 110. Within the internal combustion engine 110, compressed air from the atmosphere is combined with fuel to power the engine 110. Combustion of the fuel produces exhaust gas that is operatively vented to the exhaust manifold 116. From the exhaust manifold 116, a portion of the exhaust gas may be used to power a turbocharger turbine 118. The turbine 118 may drive a turbocharger compressor 120, which compresses engine intake air before directing it to the intake manifold 114.

At least a portion of the exhaust gases output from the exhaust manifold 116 may pass through a catalytic component 140, 142 and/or particulate filters 150 in order to reduce the number of pollutants contained in the exhaust gas before venting the exhaust gas into the atmosphere. Another portion of the exhaust gas may be re-circulated to the engine 1110. In certain embodiments, the engine gas recirculation cooler 122, which is operatively connected to the inlet of the intake manifold 114, cools exhaust gas in order to facilitate increased engine air compression. In certain embodiments, a portion of the exhaust gas may be diverted through a system valve to an exhaust bypass. The exhaust gas bypass may have an outlet operatively linked to the inlet of a particulate filter 150, which may comprise a catalytic soot filter in certain embodiments.

Exhaust gas may pass through a catalytic component 140, such as a hydrocarbon (HC) oxidation catalyst or the like, in certain embodiments. Various sensors, such as temperature sensors 124, pressure sensors 126, and the like, may be strategically disposed throughout the exhaust gas after-treatment system 100 and may be in communication with the controller 130 to monitor operating conditions.

The exhaust gas after-treatment system 100 may direct the exhaust gas to the inlet of another catalytic component 140, such as a $NO_x$ adsorption catalyst or the like. Alternatively or in addition, a particulate filter 150 may comprise a catalytic soot filter in certain embodiments. Particulate matter in the exhaust gas, such as soot and ash, may be retained within the particulate filter 150. The exhaust gas may subsequently be vented to the atmosphere.

In addition to filtering the exhaust gas, the exhaust gas after-treatment system 100 may include a system for introducing a reactant, such as fuel, into the exhaust gas or into components of the exhaust gas after-treatment system 100. The reactant may facilitate oxidation of various chemical compounds adsorbed within catalytic components 142 and may also facilitate regeneration of the particulate filter 150. The fuel tank 180, in one embodiment, may be connected to the reactant pump 170. The pump 170, under direction of the controller 130, may provide fuel or the like to a reactant delivery mechanism 190, such as a nozzle, which may be operatively coupled to the inlet of the catalytic component 142 and/or a particulate filter 150. The reactant pump 170, the reactant delivery mechanism 170, and an exhaust valve, in certain embodiments, may be directed by the controller 130 to create an environment conducive to oxidation of chemical compounds.

One method to regenerate at least one component of the exhaust gas after-treatment system 100, according to one embodiment, comprises periodically reducing the flow of exhaust gas to a catalytic component 142 undergoing regeneration and introducing reactant into the catalytic component 142. During the same duty cycle, the controller 130 directs the reactant pump 170 to deliver reactant to the reactant delivery mechanism 190. The controller 130 subsequently regulates the delivery mechanism 190 to deliver selected amounts of reactant into a catalytic component 142. During the same duty cycle after each injection of reactant, the delivery mechanism 190 may be closed and no additional reactant delivered directly to the catalytic component 142. The effect of this sequence produces a series of injections of reactant into the inlet of the catalytic component 142 during a given duty cycle. As a result, the controller 130 may control the rate of regeneration of the catalytic component 142 and/or the particulate filter 150.

In certain embodiments, the exhaust gas after-treatment system 100 may be configured to determine an appropriate time to introduce reactant into the system 100. Appropriate timing of regeneration may contribute to an increase in the fuel economy of a vehicle, extended life expectancy of a particulate filter, and increased overall efficiency of an engine 1110.

Figure 2:
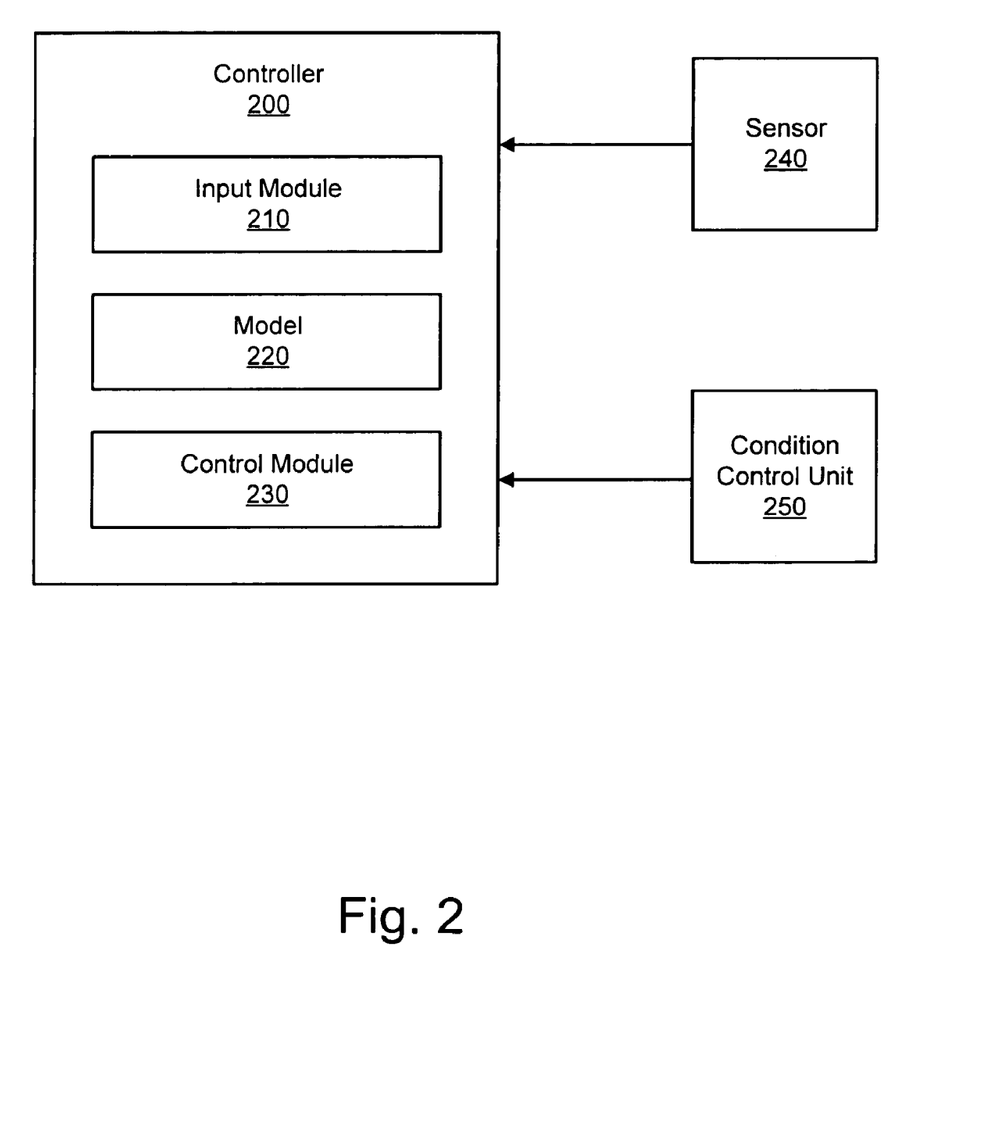
FIG. 2 is a schematic block diagram illustrating one embodiment of a controller in accordance with the present invention.

FIG. 2 illustrates one embodiment of a controller 200 in accordance with the present invention. The controller 200 may include an input module 210, a model 220, and a control module 230. The controller 200 may receive input from one or more sensors 240 and may further receive input from a condition control unit 250. The condition control unit 250 may comprise an engine control unit in certain embodiments. In yet another embodiment, the controller 200 may be integrated into an engine control unit.

The input module 210 may be configured to receive input from a sensor 240. In one embodiment, the sensor 240 may comprise a differential pressure sensor 160 of an exhaust gas after-treatment system 100. The input module 210 may further be configured to receive input from other sensors or devices. In certain embodiments, the input module 210 receives input from the condition control unit 250 or from other devices within an exhaust gas after-treatment system 100. The input module 210 may also provide a sensor response to the control module 230.

The model 220 may facilitate defining an expected response value and may be constructed with various configurations. In one embodiment, the model 220 is founded on theoretical calculations, such as mass balance equations, for example. Alternatively, the model 220 may be based on empirical research. Data may be the product of statistical analysis. Further still, the model 220 may comprise values derived from both theoretical calculations and empirical research. In one embodiment, the model 220 determines a rate. The model 220 may provide estimated information to correspond with information provided by one or more sensors 240.

The model 220 may provide an estimation of an expected sensor response value. In one embodiment, the model 220 corresponds to an estimate of particulates emitted from an operating engine 110. In an alternative embodiment, the model 220 estimates an oxidation rate to determine an amount of particulates consumed. Determining the oxidation rate of soot and/or the amount of soot consumed by oxidation on a particulate filter may facilitate determining an accurate estimation of soot remaining on the particulate filter. One method for determining an oxidation rate is disclosed in related application Ser. No. 11/227,403 entitled, "APPARATUS, SYSTEM, AND METHOD FOR ESTIMATING PARTICULATE CONSUMPTION," which is hereby incorporated by reference into this document. Those of skill in the art will recognize that the model 220 may be configured to determine various measurements and/or calculations to determine or define a particular situation and/or event. The model 220, in certain embodiments, may calculate an expected response value from data input and may provide the expected response value to the control module 230.

The control module 230 may be configured to determine an output value based on input from the sensor response and the expected response value. The sensor response and the expected response value may be combined in a weighted manner according to a predicted reliability of the sensor response and/or the estimation. In one embodiment, the predicted reliability is defined as a trust factor derived from parameters based on defined conditions. For example, physical conditions such as temperature, exposure time, pressure, and the like may influence the response of a sensor 240 and/or estimation, such as the model 220. The trust factor may predict the reliability of the sensor 240 or the model 220 under defined conditions. Under one condition, the sensor 240 may be deemed reliable, while under another condition, the sensor 240 may not be reliable to provide an accurate sensor response.

Figure 3:
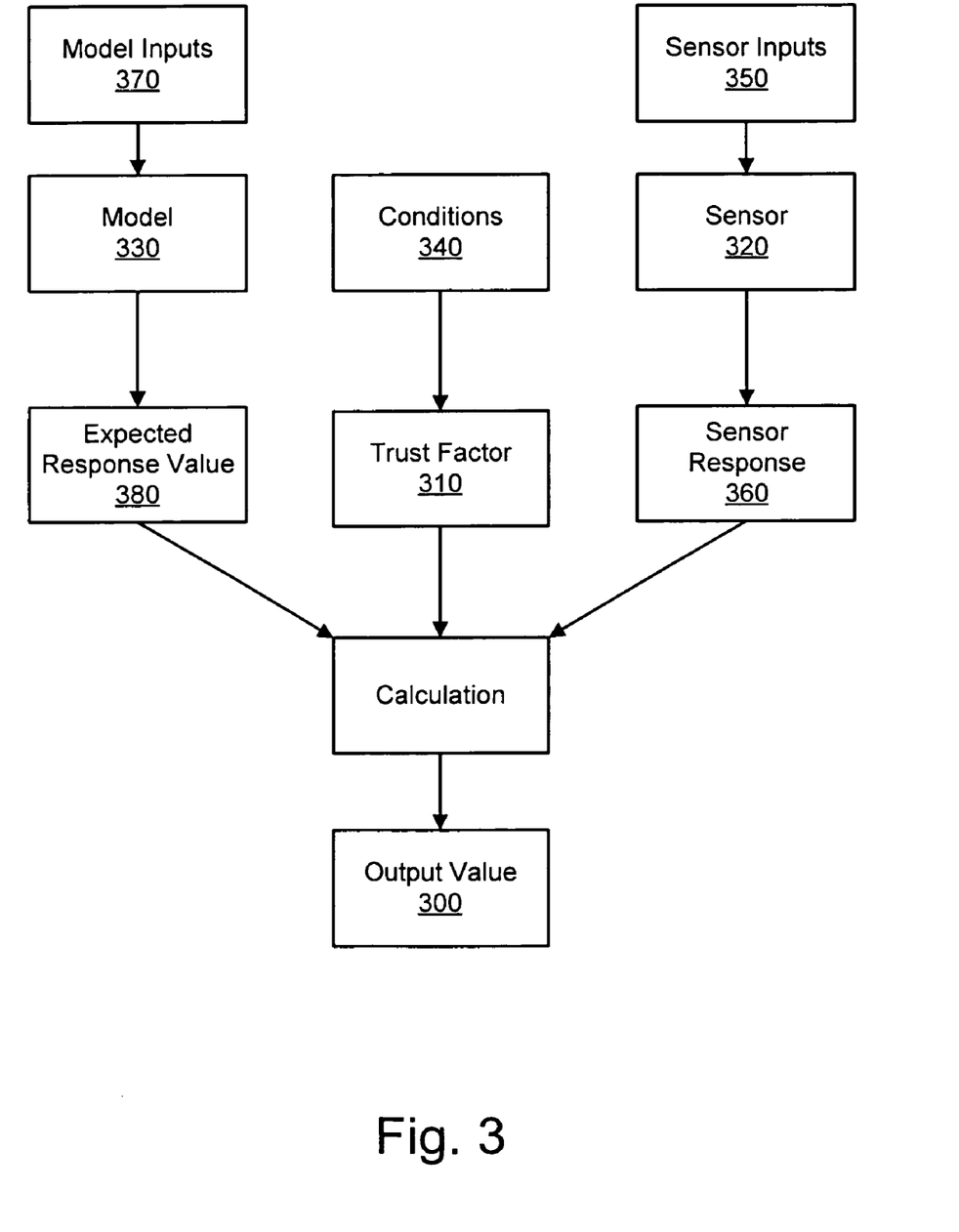
FIG. 3 is a schematic block diagram illustrating one embodiment of a process flow for obtaining an output value in accordance with the present embodiment.

FIG. 3 illustrates one embodiment of an output value 300 derived from a combination of an expected response value 380 and a sensor response 360. A trust factor 310 based on conditions 340 enables the sensor response 360 and the expected response value 380 to be weighted according to a predicted reliability. In one embodiment, the predicted reliability provides a ratio that enables a percentage of the expected response value 380 and a percentage of the sensor response 360 to be added together to form the output value 300. The calculated output value 300 consequently represents outputs from both the model 330 and the sensor 320 and the conditions 340 that influence the reliability of both.

In one embodiment, the model 330 receives inputs 370 that are separate and different from the inputs 350 that influence the sensor 320. As a result, if the sensor inputs 350 and the sensor response 360 are less reliable, the expected response value 380 derived from the model 330 and the model inputs 370 may be more reliable under certain circumstances, and vice versa. In addition, a combination output value 300 is influenced by a wide range of inputs 370, 350 and conditions 340.

Figure 4:
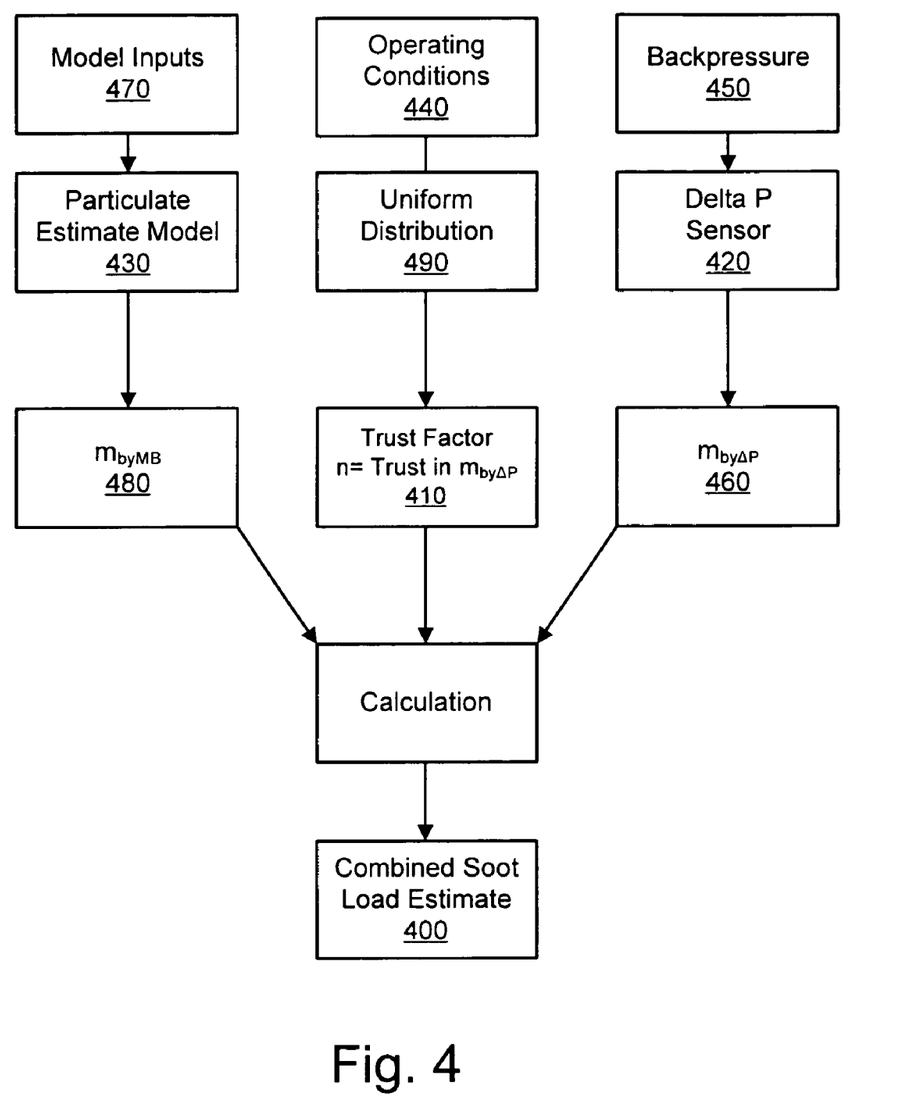
FIG. 4 is a schematic block diagram illustrating another embodiment of a process flow for obtaining a combined soot load estimate in accordance with the present embodiment.

FIG. 4 illustrates one embodiment of the present invention applied to an exhaust gas after-treatment system 100. In the depicted embodiment, a combined soot load estimate 400 of a particulate filter 150 is derived from a mass estimate 460 based on a delta pressure sensor 420 measurement, which is known in the art, and a mass estimate 480 derived from a mass balance particulate estimate model 430. A trust factor 410 indicates the reliability of the delta pressure mass estimate 460. In certain embodiments, the trust factor 410 is determined from engine operating conditions 440, such as exhaust gas flow rate, for example, and an estimation of the distribution 490 of soot across a particulate filter 150, including regeneration events. A method for utilizing a trust factor is disclosed in greater detail in related application Ser. No. 11/227,060 entitled, "APPARATUS, SYSTEM, AND METHOD FOR DETERMINING AND IMPLEMENTING ESTIMATE RELIABILITY," which is hereby incorporated by reference into this document.

The backpressure 450 on a particulate filter 150 may be a strong indicator of the soot load present in the filter 150.

Particularly during operating conditions with a high exhaust gas flow rate, the mass estimate 460 derived from the delta pressure sensor 420 measurement may provide an accurate estimate of the soot load, especially if the soot is distributed equally across the filter 150. Consequently, the trust factor 410 may indicate a high reliability of the mass estimate 460 in such a condition.

Alternatively, delta pressure sensor 420 measurements actuated during operating conditions 440 with a low exhaust gas flow rate, or maldistributed soot accumulation, tend to exhibit great deviation, causing inaccurate particulate mass estimations 360. In such conditions, the trust factor 410 may determine a low reliability in the mass estimate 360. Accordingly, the mass estimate 360 may be weighted against a mass estimate 480 derived from a steady, less deviating model 430 or the like. The combined soot load estimate 400 consequently reflects actual measured data as well as expected results. In certain embodiments, the trust factor 410 may indicate zero trust in the delta pressure mass estimate 460, in which case the delta pressure sensor 460 response is accounted for little, if at all, in the combined output estimate 400.

In one embodiment, a delta pressure estimated mass 460 is determined by comparing a previously determined mass estimate to a current mass estimate. The increase may subsequently be compared to an increase determined by one or more alternative methods of estimation to ascertain the probability of the estimated increase.

In the depicted embodiment, the mass estimate 480 derived from the model 430 may be a strong indicator of actual soot load over a short period of time and under particular conditions, such as when an engine 110 is first initialized. In one embodiment, the particulate estimate model 430 receives input from multiple indicators, such as RPM, total fueling, engine timing, EGR fraction, air-fuel ratio, fuel rail-pressure, temperature and the like. Various particulate estimate models 430 known in the art may be used to determine a particulate mass estimate 480. In one embodiment, the model 430 determines a rate of accumulation by comparing the relationship of soot accumulation over time (Δ soot load/Δ time) and further determining a mass estimate 480 relative to known operating conditions 440.

The model estimate 480, however, generally varies greatly from the actual soot load over long periods of time. Filter regenerations based solely on a mass balance or model-based estimate, which generally discount uncontrolled regenerations and other events effecting actual soot accumulation, typically result in unnecessary fuel penalty and overexposure of the particulate filter to high temperatures. The trust factor 410, which may indicate a rate of decay, enables the combined soot load estimate 400 to slide between both the delta pressure mass estimate 460 and the model-based mass estimate 480. Extreme conditions and/or anomalies evidenced by either estimate 460, 480 consequently are mitigated and balanced over time, thus facilitating determining accurate soot load estimates.

The combined soot load estimate 400, in one embodiment, is determined by combining a portion of the delta pressure estimate 460 and a portion of the model-based estimate 480. The trust factor 410 provides a ratio that enables a percentage of the expected response value 480 and a percentage of the sensor response value 460 to be added together to form the output value 400. For example, in one embodiment, if the trust in the delta pressure estimate 460 is determined to be about fifty percent, then half of the delta pressure estimate 460 would be added to half of the model-based estimate 480 to determine a combined soot load estimate 400. In certain embodiments, other inputs, such as oxidation rates and the like, may be used to determine a combined soot load estimate 400. The trust factor 410 facilitates determining whether the delta pressure estimate 460 is reliable.

Figure 5A:
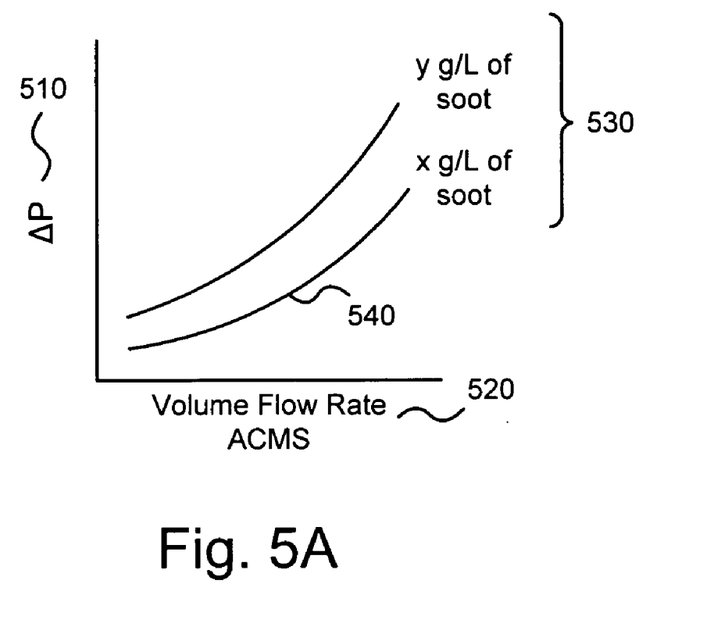
FIG. 5A is a graph illustrating one embodiment of a soot load estimate derived from a delta pressure measurement.
Figure 5B:
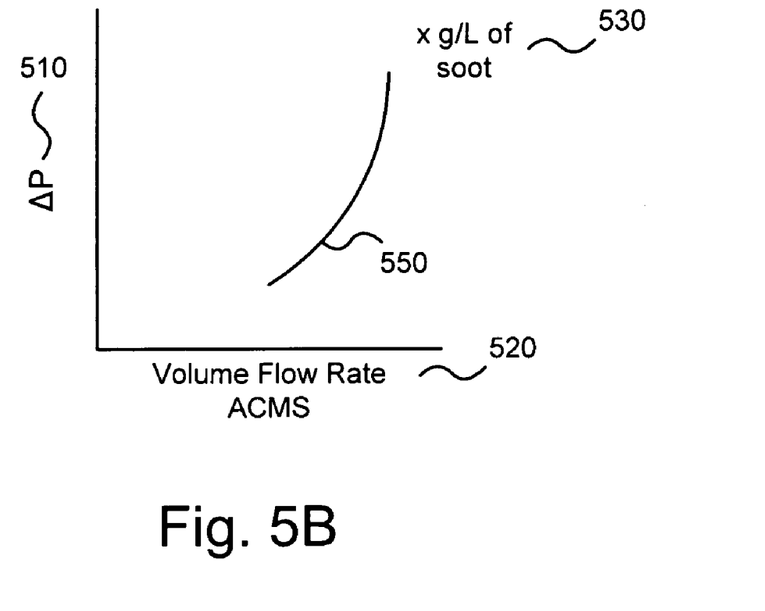
FIG. 5B is a graph illustrating one embodiment of an abnormal result for a soot load estimate derived from a delta pressure measurement.

FIGS. 5A and 5B are graphs illustrating a delta pressure measurement 510 relative to an exhaust gas flow rate 520 and a soot load accumulation 530 according to one embodiment. FIG. 5A represents a probable correlation of delta pressure 510 for a soot load (x,y) with a specified volume flow rate 520. As the flow rate 520 increases, the delta pressure measurement 510 increases along a predicted curve 540 when the soot is evenly distributed on the particulate filter. Consequently, the delta pressure measurement 510 may, under certain circumstances, accurately indicate the accumulated soot load. This method to determine an estimated soot load has been widely used in the art in exhaust gas after-treatment systems to determine when to regenerate a particulate filter. However, as mentioned, the delta pressure measurement 510 does not always accurately reflect the actual amount of soot accumulated on a particulate filter.

FIG. 5B illustrates a deviating delta pressure 510 curve 550 affected by a previous event, such as a regeneration event that oxidizes only a portion of the soot accumulated on the particulate filter, thereby creating holes in the accumulated soot. The holes cause the accumulated soot to be maldistributed across the particulate filter, permitting exhaust gas to pass through the filter at a lower delta pressure 510 than expected for the actual amount of soot remaining on the particulate filter. Under such circumstances, the delta pressure measurement 510 alone may indicate an incorrect amount of soot on the particulate filter, particularly if a predicted curve 540 for evenly distributed soot is referenced.

Using a trust factor to determine a combined output value may mitigate the effects of a partial regeneration event on an exhaust gas after-treatment system, particularly a system estimating a soot load solely from a delta pressure sensor response. If a delta pressure sensor response following a predicted curve 540 suddenly jumps to an abnormal response curve 550, the trust factor may shift trust away from the delta pressure sensor response in favor of a model-based response. Shifting trust away from the delta pressure sensor response prevents the exhaust gas after-treatment system 100 from registering an incorrect soot load amount.

In certain embodiments, the model-based estimate provides directional information to indicate a general prediction of the soot load based off of known information. The directional information may be supplemented with verified information in certain embodiments. The model-based estimate may reference the path 540 to facilitate calculating an accurate estimate of the actual accumulation and/or distribution of the soot. Over time the dual responses, model-based and sensor-based, tend to balance each other, providing more accurate feedback.

Figure 6A:
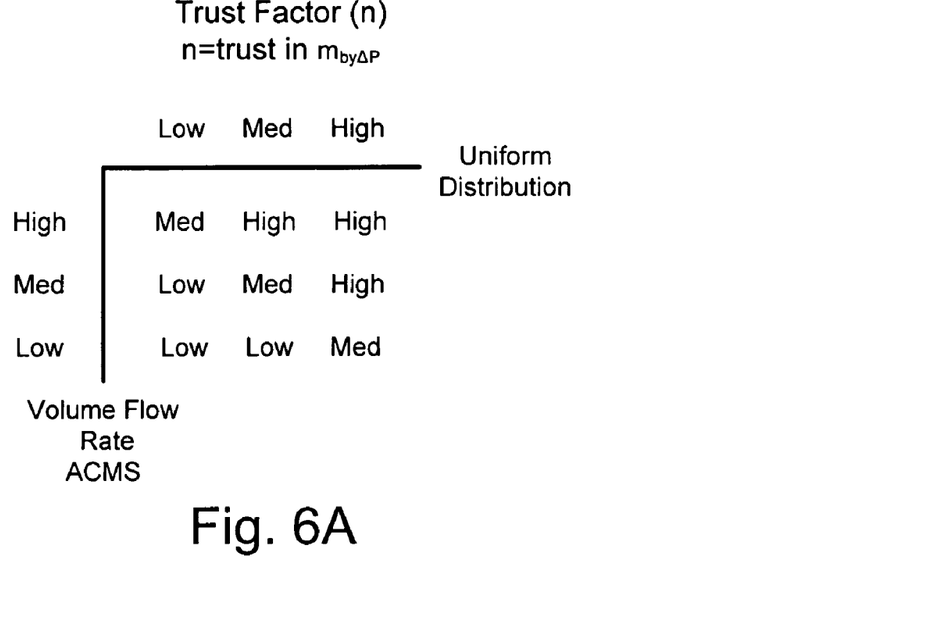
FIG. 6A is a chart illustrating one embodiment of a trust factor determiner based on defined conditions in accordance with the present invention.

FIG. 6A illustrates one embodiment of a trust factor (n), wherein n is a number between 0–10, 1 representing a low trust and 10 representing high trust in the delta-pressure-based estimate. When the volumetric flow rate of the exhaust gas and the uniform distribution of soot accumulation are high, the trust factor is high and the delta pressure sensor response is mainly used to determine the soot load estimate. When the volumetric flow rate and the uniform distribution are low, the trust factor is low and the model-based expected response is mainly used to estimate soot accumulation.

When the trust factor is medium, the soot load estimate may be based on the delta pressure sensor response and the model-based expected response. The trust factor indicates a direction, or rate of decay to the absolute value of the delta pressure sensor estimate.

Figure 6B:
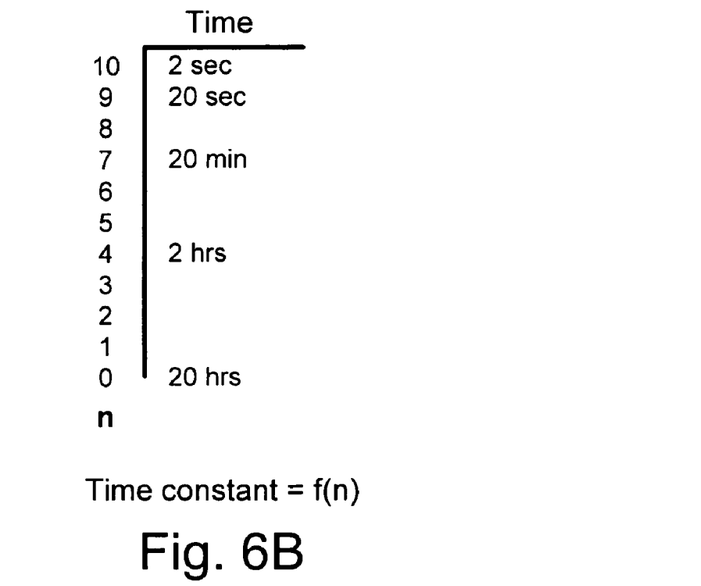
FIG. 6B is a chart illustrating one embodiment of a trust factor converted to a time constant in accordance with the present invention.

FIG. 6B illustrates one embodiment of a trust factor (n) converted to a time constant, which is a function of the trust factor (n) in certain embodiments. The time constant represents the time required for the delta-pressure-based soot load estimate to be constant at a certain level in order to trust the soot load estimate to represent the actual soot load in a particulate filter. A low level trust requires more time for the delta pressure sensor estimate to be trusted, while a high level trust requires less time to trust the delta pressure sensor estimate. The time constant may be exponential.

Figure 7:
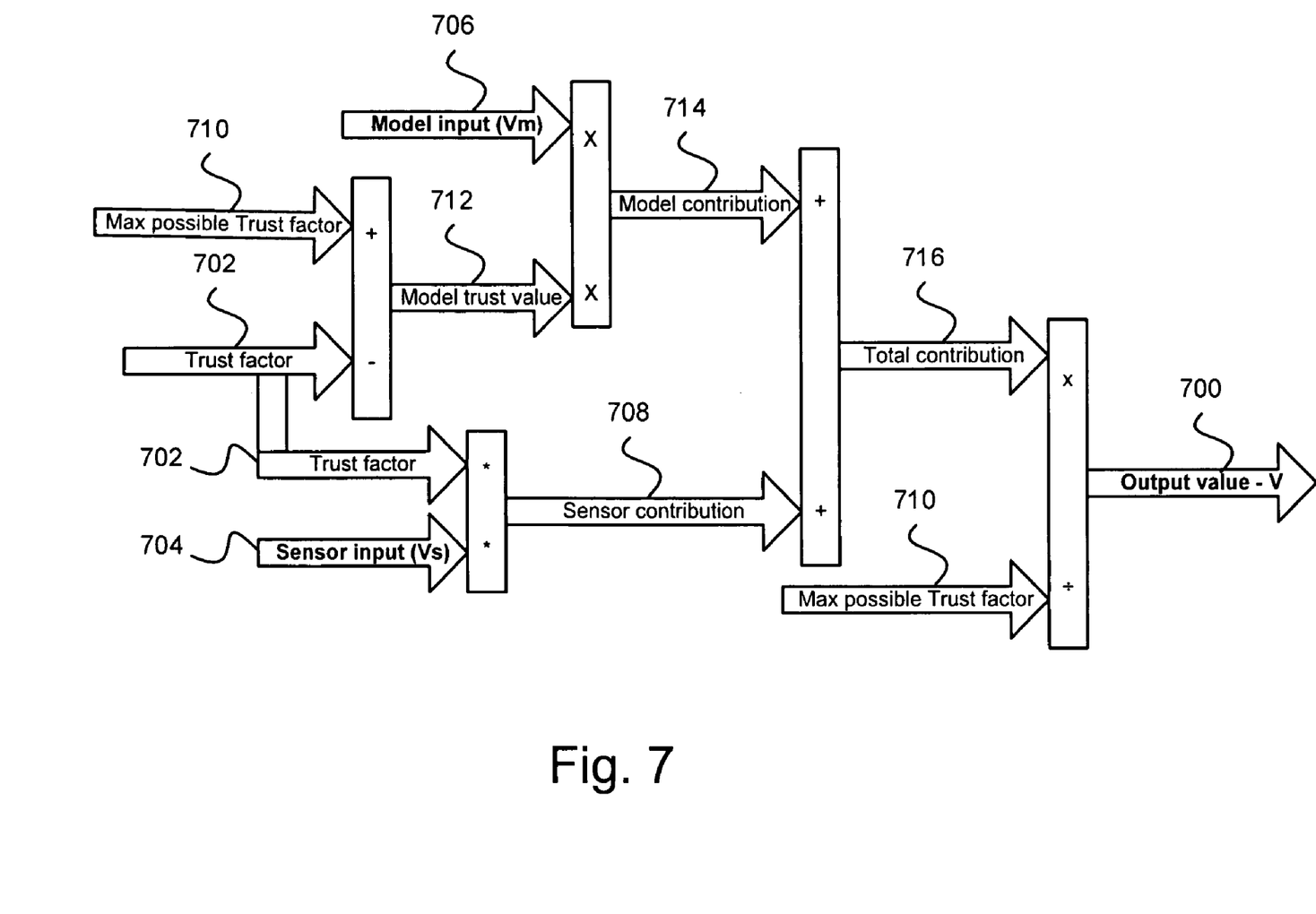
FIG. 7 is a schematic flow chart diagram illustrating one embodiment of a manner of calculating a combined output value obtained from a trust factor.

FIG. 7 illustrates one embodiment of an output value (V) 700 obtained from a trust factor 702 applied in conjunction with both a sensor input 704 and a model input 706. In the depicted embodiment, the output value (V) 700 is estimated without converting the trust factor 702 to a time constant. The trust factor 702 and the sensor input 704 are combined to determine a sensor contribution 708. Similarly, the trust factor 702 is subtracted from a maximum possible trust factor 710 to determine a model trust value 712, which is then multiplied by the model input 706 to obtain a model contribution 714. The model contribution 714 and the sensor contribution 708 are combined to obtain a total contribution 716. The total contribution 716 may be evaluated against the maximum possible trust factor 710 to determine the output value (V) 700. In the depicted embodiment, the sensor input 704 and the model input 706 are measurements of essentially the same data, such as soot accumulation.

In alternative embodiments, various combinations of input may be used to determine an estimated output value (V) 700. A sensor input 704 and a model input 706 may be derived from essentially the same data as described above. Alternatively, the sensor input 704 and the model input 706 may be derived from fundamentally different data. For example, the sensor input 704 may provide a direct measurement, such as soot accumulation (S), while the model input 706 represents an estimation of a rate of change (dS/dt).

In addition, a time constant (f(trust factor) may be used in conjunction with or instead of the trust factor 702. In select embodiments, both a trust factor 702 and a time constant are used to estimate the model contribution 714 and sensor contribution 708. Alternatively, or in addition, the time constant may be used to determine both contributions 714, 708.

Figure 8:
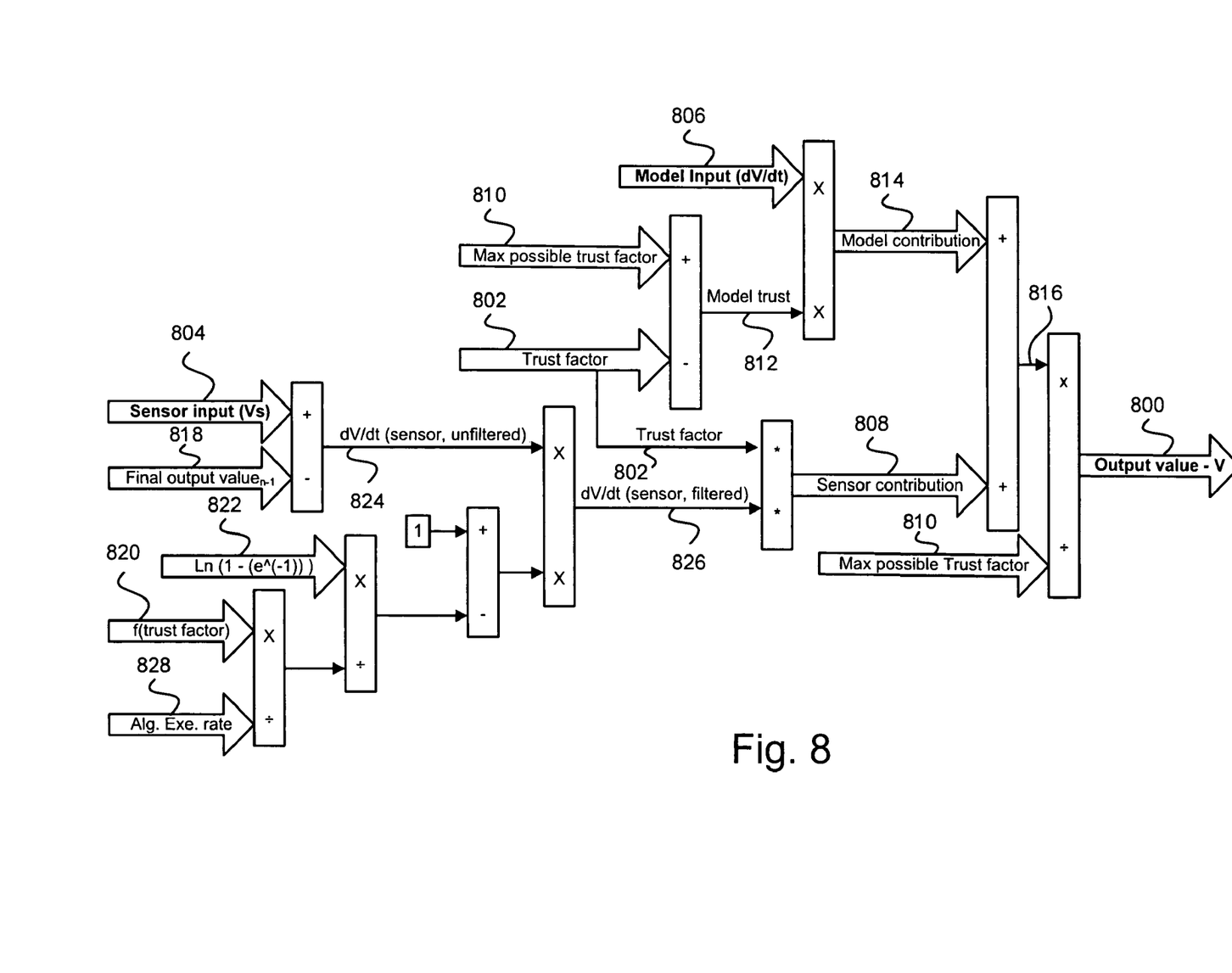
FIG. 8 is a schematic flow chart diagram illustrating one embodiment of a manner of calculating a combined output value obtained from a trust factor and a time constant.

FIG. 8 illustrates one embodiment of an output value (V) 800 obtained from a model input 806 that estimates the derivative of the desired value (dV/dt). The sensor input 804 is a direct measurement of the desired value (V). In the depicted embodiment, the model input 806 is multiplied by a model trust value 812 derived from a maximum possible trust factor 810 and a trust factor 802 to determine a model contribution 814. The sensor contribution 808 is determined using both a trust factor 802 and a time constant (f(trust factor)) 820. The sensor input value 804 may be combined with a final output value$_{n-1}$ 818 to determine an unfiltered sensor value (dV/dt) 824. An algorithm execution length 828 and other equations 822, 824 may be used to determine a filtered sensor value (dV/dt) 826. As depicted, the filtered sensor value (dV/dt) 826 may be multiplied by the trust factor 802 to determine a sensor contribution 808. Subsequently, the model contribution 814 and the sensor contribution 808 are combined to obtain a total contribution 816, which may be evaluated against the maximum possible trust factor 810 to determine the final output value (V) 800 and a final output value$_{n-1}$ 817.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
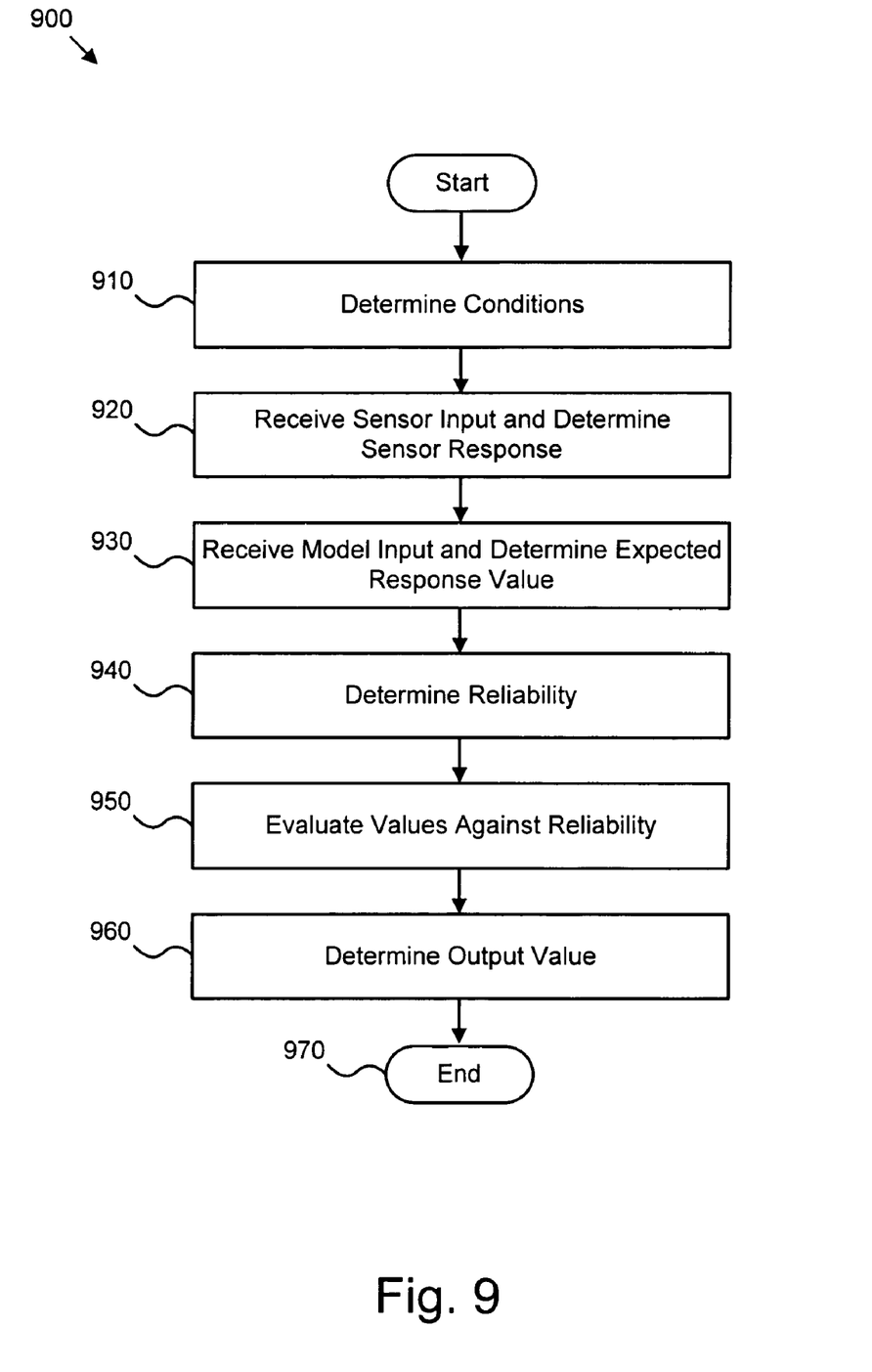
FIG. 9 is a schematic flow chart diagram illustrating one embodiment of an output value determination method of the present invention.

FIG. 9 illustrates one embodiment of an output value determination method 900 of the present invention. The output value determination method 900 may include the steps of determining 910 related conditions, receiving 920 sensor input and calculating a sensor response, receiving 930 model input and determining an expected response value, determining 940 a predicted reliability of one of the sensor response or the expected response value, evaluating 950 values against the predicted reliability, and determining 960 an output value by combining weighted values of the sensor response and the expected response values. In certain embodiments, the predicted reliability may be a trust factor converted to a time constant.

The output value determination method 900 may be applied to a sensor-based control system wherein the reliability of a sensor response is questionable under defined circumstances. The weighted, combined output value provides an intermediate response that allows the system to determine an estimated response when a sensor response is less reliable. The output value determination method 900 also allows the output value to slide between a model-based estimate and a sensor-based estimate, thereby reducing the impact of sudden or unexpected changes on the system, particularly those caused by distorted sensor responses.

Figure 10:
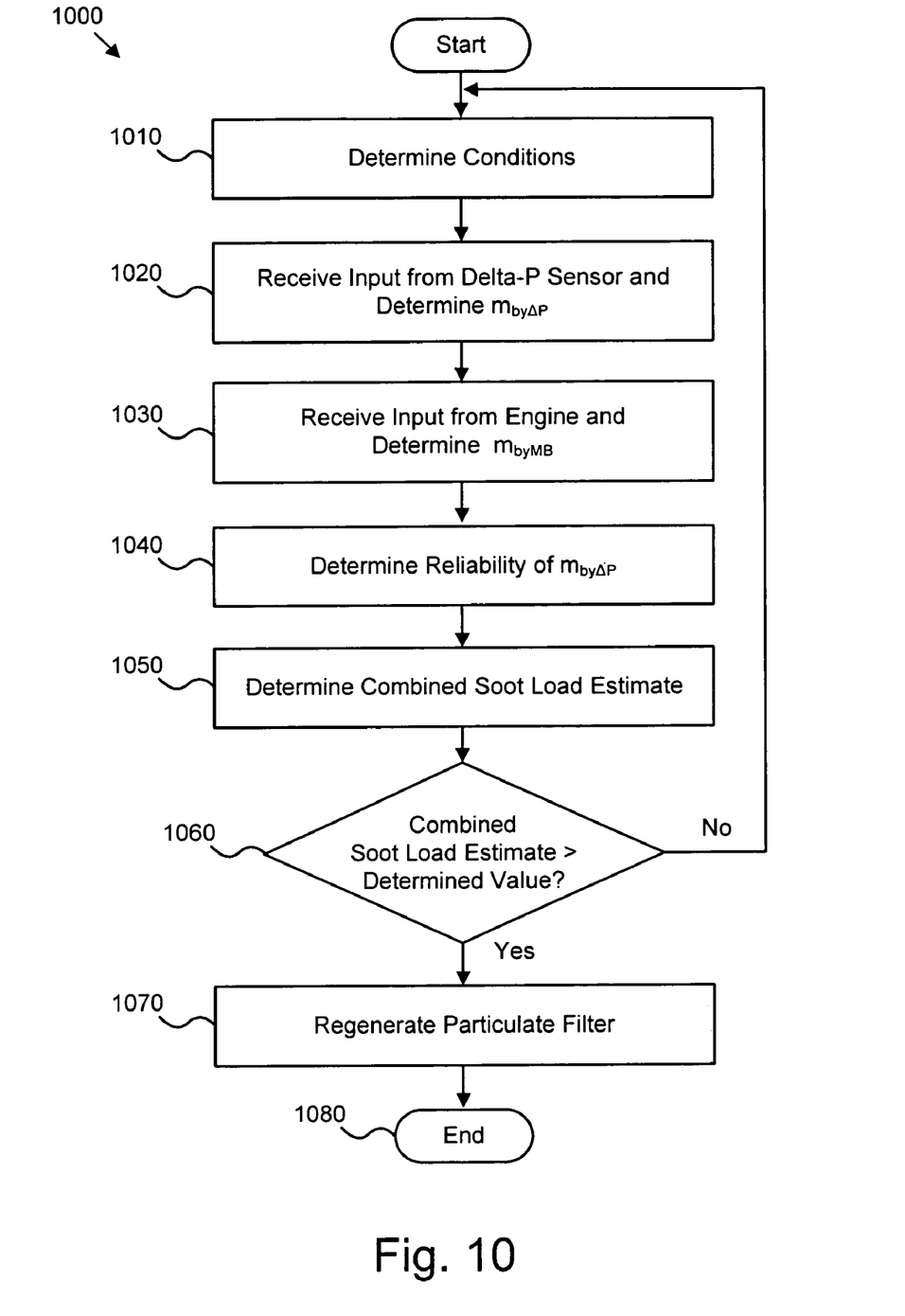
FIG. 10 is a schematic flow chart diagram illustrating one embodiment of a particulate filter regeneration method in accordance with the present invention.

FIG. 10 illustrates one embodiment of a particulate filter regeneration method 1000 in accordance with the present invention. The particulate filter regeneration method 1000 may include the steps of determining 1010 relative conditions, receiving 1020 input from a differential pressure sensor 160 and determining a soot load estimate, receiving 1030 input from an engine 110 or an engine controller 130 and determining a soot load estimate, determining 1040 the reliability of the soot load estimate based on the delta pressure, determining 1050 a combined soot load estimate, deciding 1060 whether the combined soot load estimate meets a criteria for regeneration, and regenerating 1070 a particulate filter.

In one embodiment, determining 1010 conditions comprises monitoring engine 110 activity and determining a mass volume flow rate for the exhaust gas. The reliability of the delta pressure sensor response may be affected by the exhaust gas flow rate and the distribution of accumulated soot in a particulate filter 150. In one embodiment, the input module 210 receives 1020 input from the differential pressure sensor 160 and determines a soot load estimate. The input module 210 may further receive input from an engine controller 130 and the like and may use the input to determine 1030 a soot load estimate derived from a model 220 as discussed in relation to FIG. 4. A control module 230 may determine 1040 the reliability of the sensor response based on the relative conditions and may determine 1050 a combined soot load estimate by weighing each estimate according to its reliability. The weighted responses may be combined to determine a combined output value. The combined output value may subsequently be used to regenerate 1070 a particulate filter if desired.

The particulate filter regeneration method 1000 provides representative feedback to a control system based on combined input from a sensor and input from a calculated estimate. When applied to an exhaust gas after-treatment system 100, the particulate filter regeneration method 1000 enables effective and timely regeneration of a particulate filter 150, increases the fuel economy of a vehicle, extends the life expectancy of the particulate filter 150, and increases the overall efficiency of an engine.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for providing system feedback from combined input values in a sensor-based control system in which the reliability of a sensor response is questionable under defined conditions, the apparatus comprising:
an input module for receiving input from a sensor, the sensor configured to provide a sensor response;
an estimation for defining an expected response value;
a control module configured to determine an output value selectively incorporating the sensor response and the expected response value in a weighted manner according to a predicted reliability of one of the sensor response and the estimation, wherein the predicted reliability is defined as a trust factor derived from parameters based on defined conditions;
wherein the trust factor is further based on an exhaust flow rate from an internal combustion engine; and
wherein the sensor is a differential pressure sensor disposed on an upstream side and a downstream side of a particulate filter.

2. An apparatus for providing system feedback from combined input values in a sensor-based control system in which the reliability of a sensor response is questionable under defined conditions, the apparatus comprising:
an input module for receiving input from a sensor, the sensor configured to provide a sensor response;
an estimation for defining an expected response value; and
a control module configured to determine an output value selectively incorporating the sensor response and the expected response value in a weighted manner according to a predicted reliability of one of the sensor response and the estimation, wherein the predicted reliability is a trust factor derived from parameters based on defined conditions.

3. The apparatus of claim 2, wherein the trust factor predicts the reliability of a response value based on defined conditions.

4. The apparatus of claim 2, wherein the trust factor is a time constant.

5. The apparatus of claim 2, wherein the trust factor is a time constant based on an exhaust flow rate from an internal combustion engine.

6. The apparatus of claim 2, wherein the sensor is a differential pressure sensor disposed on an upstream side and a downstream side of a particulate filter.

7. The apparatus of claim 6, wherein the output value is an estimation of soot accumulation on a particulate filter.

8. The apparatus of claim 6, wherein the output value is an estimation of distribution of soot accumulated on a particulate filter.

9. The apparatus of claim 2, wherein the estimation is a model.

10. The apparatus of claim 9, wherein the model is based on theoretical calculations.

11. The apparatus of claim 9, wherein the model comprises a table comprising combined values based on theoretical calculations and empirical research.

12. An exhaust gas after-treatment system for providing system feedback from combined input values in a sensor-based control system in which the reliability of a sensor response is questionable under defined conditions, the system comprising:
a sensor configured to provide a sensor response;
a controller configured to determine an output value selectively incorporating a sensor response and an expected response value in a weighted manner according to a predicted reliability of one of the sensor response and an expected response value; and
further comprising an internal combustion engine that produces exhaust gas as a byproduct of operation, wherein the defined conditions are influenced by operation of the internal combustion engine; and
wherein the sensor comprises a differential pressure sensor configured to determine the pressure of exhaust gas upstream and downstream from a particulate filter.

13. The system of claim 12, further comprising a control unit configured to determine a defined condition affecting a response value.

14. The system of claim 12, further comprising a particulate filter for capturing particulate matter present in the exhaust gas produced from operation of the internal combustion engine.

15. The system of claim 12, further comprising a catalytic component for facilitating oxidation of compounds present in the exhaust gas produced from operation of the internal combustion engine.

16. The system of claim 12, further comprising a reactant delivery mechanism for supplying a reactant to facilitate oxidation of compounds present in the exhaust gas produced from operation of the internal combustion engine.

17. The system of claim 12, further comprising a model for defining an expected response value.

18. The system of claim 17, wherein the model comprises a table comprising combined values based on theoretical calculations and empirical research.

19. A signal bearing medium tangibly embodying a program of machine-readable instructions executable by a digital processing apparatus to perform operations to provide system feedback from combined input values in a sensor-based control system in which the reliability of a sensor response is questionable under defined conditions, the operations comprising:
receiving a sensor response;
estimating an expected response value;

determining an output value based on input from the sensor response and the expected response value, wherein the sensor response and the expected response value are weighted according to a predicted reliability of one of the sensor response and the estimated expected response value under defined conditions; and wherein the predicted reliability is defined as a trust factor derived from parameters based on defined conditions and wherein the instructions further comprise an operation to convert the trust factor to a time constant.

20. A signal bearing medium tangibly embodying a program of machine-readable instructions executable by a digital processing apparatus to perform operations to provide system feedback from combined input values in a sensor-based control system in which the reliability of a sensor response is questionable under defined conditions, the operations comprising:

receiving a sensor response;

estimating an expected response value;

determining an output value based on input from the sensor response and the expected response value, wherein the sensor response and the expected response value are weighted according to a predicted reliability of one of the sensor response and the estimated expected response value under defined conditions; and wherein the instructions further comprise an operation to use the output value to determine an estimation of the soot load accumulation on a particulate filter.

21. The signal bearing medium of claim 20, wherein the instructions further comprise an operation to initiate regeneration of a particulate filter when the output value indicates a regeneration condition.

22. A method for providing system feedback from combined input values in a sensor-based control system in which the reliability of a sensor response is questionable under defined conditions, the method comprising:

receiving a sensor response;

estimating an expected response value; and determining an output value based on input from the sensor response and the expected response value, wherein the sensor response and the expected response value are weighted according to a predicted reliability of one of the sensor response and the estimated expected response value under defined conditions;

wherein the method further comprises determining a predicted reliability, wherein the predicted reliability is defined as a trust factor derived from parameters based on defined conditions.

23. The method of claim 22, wherein the expected response value is derived from a model.

24. The method of claim 22, wherein the method further comprises converting the trust factor to a time constant.

25. A method for providing system feedback from combined input values in a sensor-based control system in which the reliability of a sensor response is questionable under defined conditions, the method comprising:

receiving a sensor response;

estimating an expected response value;

determining an output value based on input from the sensor response and the expected response value, wherein the sensor response and the expected response value are weighted according to a predicted reliability of one of the sensor response and the estimated expected response value under defined conditions; and wherein the method further comprises using the output value to determine an estimation of a soot load accumulation on a particulate filter.

26. The method of claim 25, wherein the method further comprises initiating regeneration of a particulate filter when the output value indicates a regeneration condition.

* * * * *